(12) United States Patent
Chang et al.

(10) Patent No.: US 8,350,819 B2
(45) Date of Patent: Jan. 8, 2013

(54) METHOD FOR DETERMINING TOUCH POINTS ON TOUCH PANEL AND SYSTEM THEREOF

(75) Inventors: Chi-Tung Chang, Taipei (TW);
Chuen-Heng Wang, Taipei (TW)

(73) Assignee: Alcor Micro Corp., Taipei (TW)

( * ) Notice: Subject to any disclaimer, the term of this patent is extended or adjusted under 35 U.S.C. 154(b) by 441 days.

(21) Appl. No.: 12/821,212

(22) Filed: Jun. 23, 2010

(65) Prior Publication Data

US 2011/0279386 A1 Nov. 17, 2011

(30) Foreign Application Priority Data

May 14, 2010 (TW) .............................. 99115362 A

(51) Int. Cl.
*G06F 3/041* (2006.01)
(52) U.S. Cl. ....................................... 345/173
(58) Field of Classification Search .................. None
See application file for complete search history.

(56) References Cited

U.S. PATENT DOCUMENTS

| | | | |
|---|---|---|---|
| 6,421,042 B1* | 7/2002 | Omura et al. | 345/157 |
| 6,597,347 B1* | 7/2003 | Yasutake | 345/173 |
| 7,342,574 B1* | 3/2008 | Fujioka | 345/175 |
| 7,443,387 B2* | 10/2008 | Tanaka et al. | 345/173 |
| 8,164,577 B2* | 4/2012 | Tsuzaki et al. | 345/173 |
| 2004/0012571 A1* | 1/2004 | Katayama | 345/173 |
| 2004/0096087 A1* | 5/2004 | Funahashi | 382/124 |
| 2007/0008298 A1* | 1/2007 | Ohta | 345/173 |
| 2009/0256818 A1* | 10/2009 | Noguchi et al. | 345/174 |
| 2010/0253642 A1* | 10/2010 | Tsuzaki et al. | 345/173 |
| 2011/0087455 A1* | 4/2011 | Chang et al. | 702/150 |
| 2011/0279386 A1* | 11/2011 | Chang et al. | 345/173 |

* cited by examiner

*Primary Examiner* — Peter Vincent Agustin
(74) *Attorney, Agent, or Firm* — Stites & Harbison, PLLC; Juan Carlos A. Marquez, Esq.; Nicholas B. Trenkle

(57) ABSTRACT

The present invention discloses a method for determining touch points on a touch panel and a system thereof. The method includes the following steps: sampling, calculating a difference, comparing the difference, sampling a determinative area, and calculating a barycenter. The barycenter position from the said steps is a touch point position. The present invention can overcome the problem of the ghost point in traditional touch panels and also be applicable for touch panels of various types.

16 Claims, 5 Drawing Sheets

51

| | | | |
|---|---|---|---|
| $Y_3$ | g | h | i |
| $Y_2$ | d | e | f |
| $Y_1$ | a | b | c |
| | $X_1$ | $X_2$ | $X_3$ |

FIG. 5

METHOD FOR DETERMINING TOUCH POINTS ON TOUCH PANEL AND SYSTEM THEREOF

BACKGROUND OF THE INVENTION

1. Technical Field

The present invention relates to a method for determining touch points on a touch panel and a system thereof, and more particularly, to the method for determining one or more touch points on a touch panel and a system thereof.

2. Description of Related Art

Touch panels that allow a user to operate the panels through direct touch operations have been widely accepted in the market because of their humanized operational interfaces. Over the last years, the touch panel technologies have experienced a continuous and rapid development and the prospect thereof is even more promising. Recently, with appearance of iPADs in the market and widespread use of Window 7, the touch panels have almost become a basic configuration of modern information products.

Currently, mainstream touch panel products found in the market are mainly categorized into the resistive ones and the capacitive ones. A resistive touch panel is formed by an indium tin oxide (ITO) glass layer and an ITO film stacked on each other, and requires application of an external force to have the ITO film and the ITO glass layer make contact with each other so that a position of a touch point can be determined through further calculation and processing. However, the resistive touch panel is disadvantageous in that, after an extended time period of use, scratches due to pressing by external forces is liable to occur on the surface of the touch panel to shorten the service life of the touch panel.

On the other hand, a capacitive touch panel operates on the following principle: before the touch panel is touched, all points on the panel are at the same potential level, but once the panel is touched by a user, a weak current will be generated between the user's body and the touch panel to form a capacitive field; then through analysis, a position of the touch point can be determined by the sensors. Furthermore, when the user slides his finger on the touch panel, a touch path of the user can be depicted.

However, the capacitive touch panel is mainly disadvantageous in that, it is very sensitive to the ambient conditions, so any variation of the ambient temperature, the moisture or the ambient electric fields will cause a signal drift or generation of noises to the capacitive touch panel, which has a direct influence on accuracy of the touch panel.

Additionally, the projective capacitive touch panel, which is a kind of further improved capacitive touch panel, has a multi-touch function; i.e., more than one touch point can be detected on the touch panel. Unfortunately, for such a touch panel that supports the multi-touch function, a problem of ghost points tends to occur in determining positions of touch points.

FIG. 1 is a schematic view illustrating formation of ghost points in the prior art. As shown in FIG. 1, the prior art touch panel that supports the multi-touch function utilizes two sensing boards to sense a longitudinal coordinate and a horizontal coordinate, respectively. Hence, when a user touches the touch panel with two fingers, the two touch points will induce two wave crests in the longitudinal direction and the lateral direction respectively. Then through an intersection calculation, this results in four touch points, two of which are the real touch points 101, 102 and the remaining two of which are false touch points 103, 104 (i.e., the so-called ghost points) that tend to cause false determination of the system. Even further, in case of a three-point touch, six false touch points will be derived, which means that the greater the number of the touch points is, the more serious the false determination caused by the ghost points will be.

BRIEF SUMMARY OF THE INVENTION

The present invention relates to a method for determining touch points on a touch panel and a system thereof, which accurately obtain positions of touch points through barycenter calculation according to sensed values acquired by sensors and differences thereof, and have no limitation on the number of touch points in use. Therefore, the present invention can be applied to a single-touch panel or a multi-touch panel.

The present invention relates to a method for determining touch points on a touch panel and a system thereof. Positions of the touch points can be directly and accurately obtained, so there is no concern about generation of ghost points as would occur in the prior art.

The present invention relates to a method for determining touch points on a touch panel and a system thereof. By correcting a preset threshold value at intervals, possibilities of false determination of touch points caused by influence of ambient conditions on the touch panel can be reduced, thereby improving accuracy of the touch panel.

To achieve the aforesaid objects, the present invention provides a method for determining touch points on a touch panel, which comprises: a sampling step for acquiring a first sensed value of each of sensors on the touch panel and storing the first sensed values; a difference calculating step for acquiring a second sensed value of each of the sensors and then acquiring a difference of each of the sensors, wherein the difference is obtained by subtracting the second sensed value sensed by each of the sensors from the first sensed value; a difference comparing step for comparing each of the differences with a preset threshold value and defining a touched sensor, wherein the difference of the touched sensor is greater than the preset threshold value and greater than the difference of each of the sensors adjacent to the touched sensor; a determinative area sampling step for acquiring each of the differences of the sensors in a determinative area, wherein the determinative area is centered around the touched sensor; and a barycenter calculating step for calculating a barycenter position according to each of the differences acquired in the determinative area sampling step, wherein the barycenter position comprises a longitudinal coordinate and a horizontal coordinate and the barycenter position is a position of the touch point.

To achieve the aforesaid objects, the present invention further provides a system for determining touch points on a touch panel by using sensors on the touch panel. The system comprises: a sampling module electrically connected to the touch panel, being configured to acquire a first sensed value of each of the sensors on the touch panel and store the first sensed values; a difference calculating module electrically connected to the sampling module, being configured to acquire a second sensed value of each of the sensors and then acquire a difference of each of the sensors, wherein the difference is obtained by subtracting the second sensed value sensed by each of the sensors from the first sensed value; a difference comparing module electrically connected to the difference calculating module, being configured to compare each of the differences with a preset threshold value and define a touched sensor, wherein the difference of the touched sensor is greater than the preset threshold value and greater than the difference of each of the sensors adjacent to the touched sensor; a determinative area sampling module electrically connected to the difference comparing module, being configured to acquire each of the differences of the sensors in a determinative area, wherein the determinative area is centered around the touched sensor; and a barycenter calculating module, being configured to calculate a barycenter position according to each of the differences acquired by the determinative area sampling module, wherein the barycenter position comprises a longitudinal coordinate and a horizontal coordinate, and the barycenter position is a position of the touch point.

Through implementation of the present invention, at least the following progressive effects can be achieved:

1. A position of a single touch point or positions of two or more touch points can be obtained to improve accuracy of the touch panel.

2. Actual positions of touch points can be determined and obtained, so the concern about generation of ghost points can be eliminated.

3. False determination caused by influence of ambient conditions on the touch panel can be avoided to improve accuracy of the touch panel.

In order for any of those skilled in the art to understand the technical disclosures of the present invention and practice the present invention, the detailed features and advantages of the present invention will be described in detail in the following description so that any of those skilled in the art can readily understand the objectives and the advantages of the present invention upon reviewing disclosures of this specification, the claims and the attached drawings.

BRIEF DESCRIPTION OF THE SEVERAL VIEWS OF THE DRAWINGS

The invention as well as a preferred mode of use and advantages thereof will be best understood by referring to the following detailed description of illustrative embodiments in conjunction with the accompanying drawings, wherein:

FIG. 5 is a schematic view illustrating an embodiment of calculating of a barycenter position according to the present invention.

DETAILED DESCRIPTION OF THE INVENTION

Figure 1:
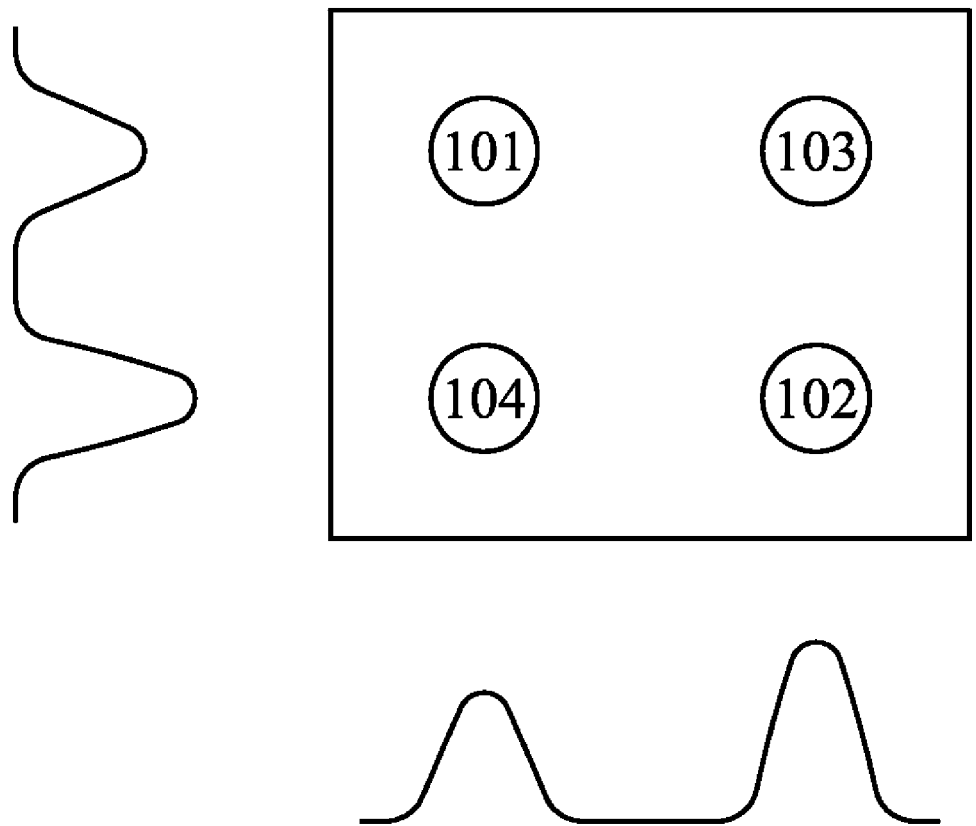
FIG. 1 is a schematic view illustrating formation of ghost points in the prior art.
Figure 2:
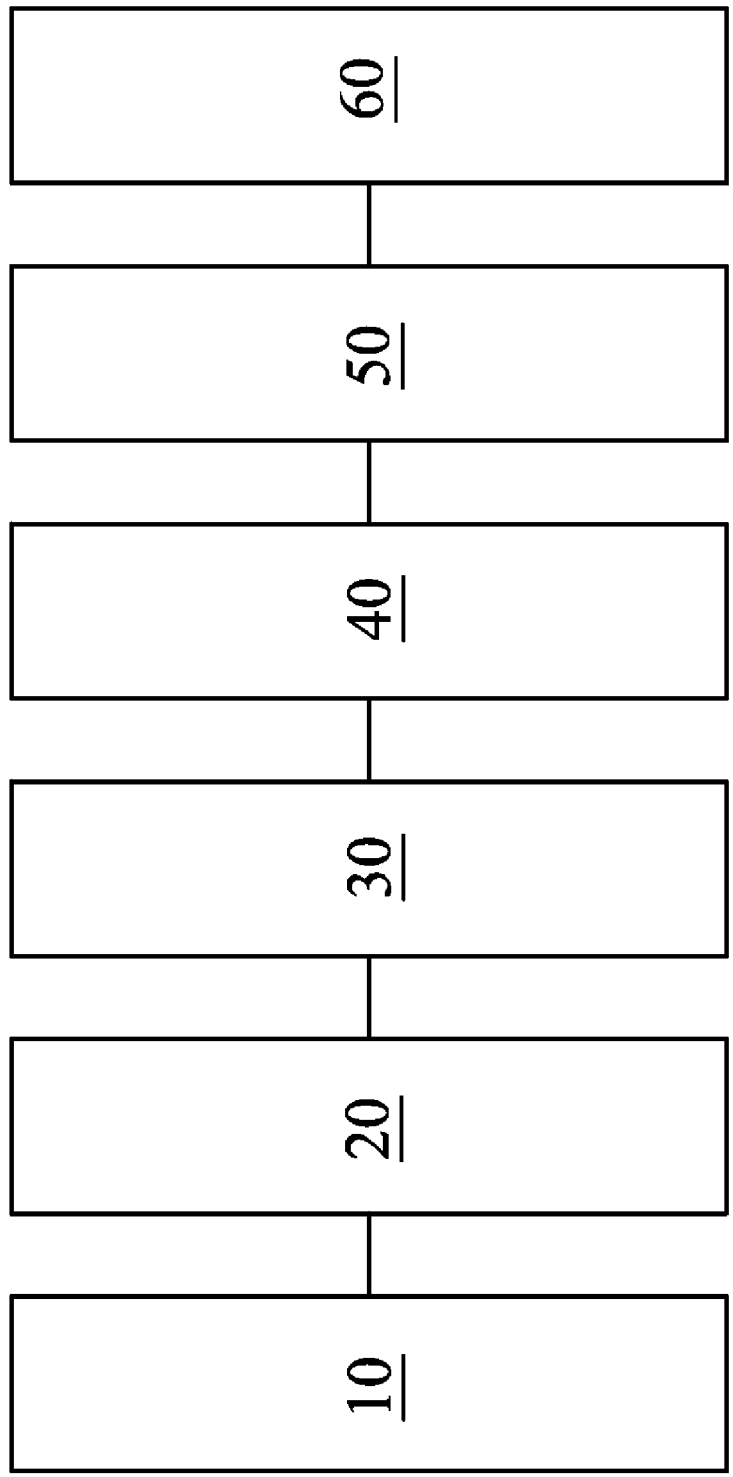
FIG. 2 is a systematic architecture view of an embodiment of a system for determining touch points on a touch panel according to the present invention.

As shown in FIG. 2, this embodiment is a system for determining touch points on the touch panel 10, which comprises: a sampling module 20, a difference calculating module 30, a difference comparing module 40, a determinative area sampling module 50, and a barycenter calculating module 60. The system for determining touch points can determine a position of an actual touch point by using sensors on the touch panel 10.

Figure 3:
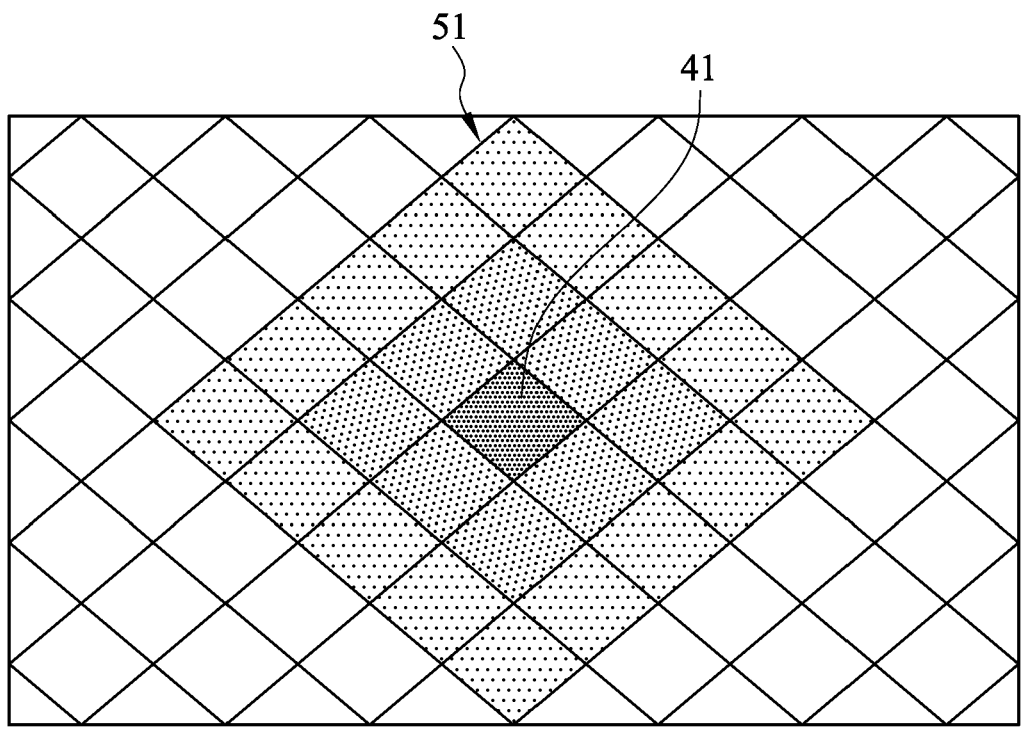
FIG. 3 is a schematic view of an embodiment of a determinative area according to the present invention.

As shown in FIG. 3, the touch panel 10 comprises a plurality of sensors which can be arranged into an array. Each of the sensors can be used to detect and represent with a sensed value a status of the touch panel 10.

Also as shown in FIG. 2, the sampling module 20 is electrically connected to the touch panel 10 and is configured to acquire a first sensed value of each of the sensors on the touch panel 10 and store the first sensed value.

The first sensed value is an initial value for the system to determine touch points. For example, the first sensed value may be defined as a sensed value sensed right after the touch panel 10 is enabled and has not been interfered by ambient conditions. Alternatively, the first sensed value may also be defined as a sensed value sampled at intervals when the touch panel 10 has operated for an extended time period so as to correct influence of ambient conditions on the touch panel 10.

The difference calculating module 30 is electrically connected to the sampling module 20, and is configured to acquire a second sensed value of each of the sensors and then calculate a difference of each of the sensors. The second sensed value is defined as a sensed value that is sensed subsequently, and the difference is obtained by subtracting the second sensed value sensed by each of the sensors from the first sensed value.

The difference comparing module 40 is electrically connected to the difference calculating module 30 and has a preset threshold value stored therein. By comparing each of the differences outputted by the difference calculating module 30 with the preset threshold value, if a difference is greater than the preset threshold value, the difference comparing module 40 can determine that a sensor to which the difference corresponds might be the sensor that is touched. If a difference of a certain one of the sensors that are touched is greater than both the preset threshold value and the difference of each of the sensors adjacent to the sensor, the sensor is then defined as a touched sensor 41 (referring to FIG. 3 as well). The preset threshold value is obtained by calculating an average value and a standard deviation according to each of the differences of the sensors in an area and adding up the average value and the standard deviation according to a ratio. Moreover, the sensors comprised in this area may be a part of or all of the sensors on the touch panel 10.

The determinative area sampling module 50 is electrically connected to the difference comparing module 40 and is primarily used to acquire each of the differences of the sensors in a determinative area 51 (referring to FIG. 3 as well). The determinative area 51 is defined to be centered around the touched sensor 41, and is formed by the sensors surrounding the touched sensor 41.

The barycenter calculating module 60 is electrically connected to the determinative area sampling module 50, and is configured to calculate a barycenter position according to each of the differences acquired by the determinative area sampling module 50. The barycenter position is a position of the touch point on the touch panel 10.

Figure 4:
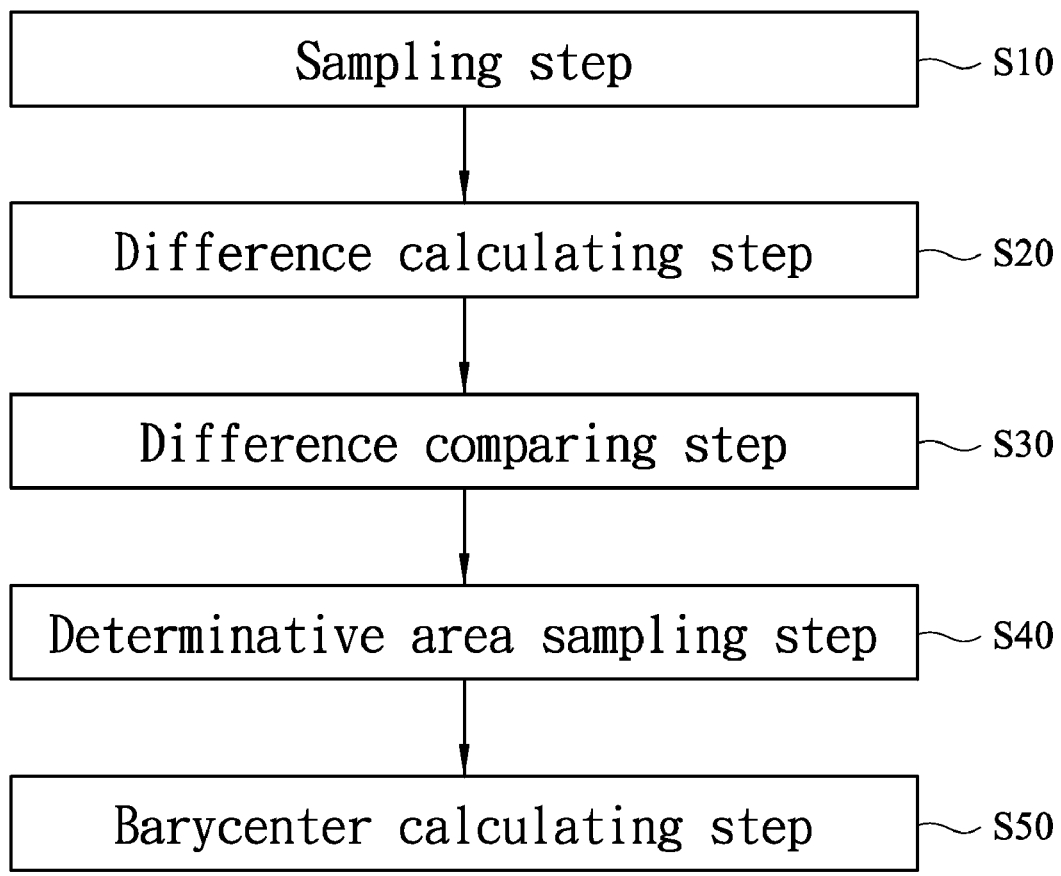
FIG. 4 is a flowchart of an embodiment of a method for determining touch points on a touch panel according to the present invention.

As shown in FIG. 4, an operating method of this system will be explained hereinbelow. A method for determining touch points on the touch panel 10 comprises: a sampling step (S10), a difference calculating step (S20), a difference comparing step (S30), a determinative area sampling step (S40), and a barycenter calculating step (S50). A barycenter position obtained through the aforesaid steps is a position of the touch point.

In the sampling step (S10), the sampling module 20 acquires the first sensed value of each of sensors on the touch panel 10 and stores the first sensed values. When the touch panel 10 is enabled or at intervals, the sampling module 20 acquires a sensed value sensed by a sensor as the first sensed value and stores the first sensed value.

In the difference calculating step (S20), the difference calculating module 30 acquires the second sensed value of each of the sensors. The second sensed value is a sensed value sensed subsequently by a sensor. After acquiring the second sensed value, the difference calculating module 30 acquires a difference of each of the sensors by subtracting the second sensed value from the first sensed value.

After the touch panel is powered on, the sensors will be affected by ambient conditions to cause difference of the second sensed value from the first sensed value. However, besides the reason that the sensors are touched, the difference may also result from so-called noises caused by ambient conditions, such as moisture, variations of temperature, approaching of electrified bodies and the like.

In the difference comparing step (S30), in order to effectively distinguish a signal of a touch point from a noise, the difference comparing module 40 defines a preset threshold value and compares each of the differences acquired by the difference calculating module 30 with the preset threshold value respectively. If a difference is smaller than or equal to the preset threshold value, it can be determined that the sensed value received by the sensor is a noise.

On the other hand, if a difference of a certain sensor is greater than the preset threshold value, it is possible that all the differences corresponding to the sensors adjacent to the touch point are greater than the preset threshold value. In this case, when the difference of the sensor is greater than the difference of each of the sensors adjacent to the sensor, the sensor is then defined as the touched sensor 41.

The preset threshold value may be obtained by calculating an average value and a standard deviation according to each of the differences of the sensors in an area and adding up the average value and the standard deviation according to a ratio. The sensors in the area may be either a part of or all of the sensors on the touch panel 10.

In the determinative area sampling step (S40), the determinative area sampling module 50 is configured to acquire a determinative area 51, and the determinative area 51 is centered around the touched sensor 41 and comprises the sensors surrounding the touched sensor 41. The determinative area sampling module 50 acquires each of the differences of the sensors in the determinative area 51. As the touched sensor 41 is only an approximate touch point, in order to acquire a position of an actual touch point more accurately, a scope of the determinative area 51 is defined to be centered around the touched sensor 41 to further calculate the actual position of the touch point.

As shown in FIG. 3, centered around the touched sensor 41 for example, a 3×3 array of nine points located at the top, the bottom, the left and the right sides and at four corners of the touched sensor 41 is determined as the determinative area 51, and the difference of each of the sensors in the determinative area 51 are acquired. Additionally, the scope of the determinative area 51 may also be further enlarged to a 5×5 array from the aforesaid 3×3 array.

In the barycenter calculating step (S50), the barycenter calculating module 60 calculates a barycenter position according to each of the differences acquired by the determinative area sampling step, wherein the barycenter position comprises a longitudinal coordinate and a horizontal coordinate. The longitudinal coordinate is equal to a divisional result obtained by dividing a sum of each of the differences in the determinative area 51 multiplied by a relative position longitudinal coordinate thereof with a sum of the differences, and the horizontal coordinate is equal to a divisional result obtained by dividing the sum of each of the differences in the determinative area 51 multiplied by a relative position horizontal coordinate thereof with the sum of the differences.

Figure 5:
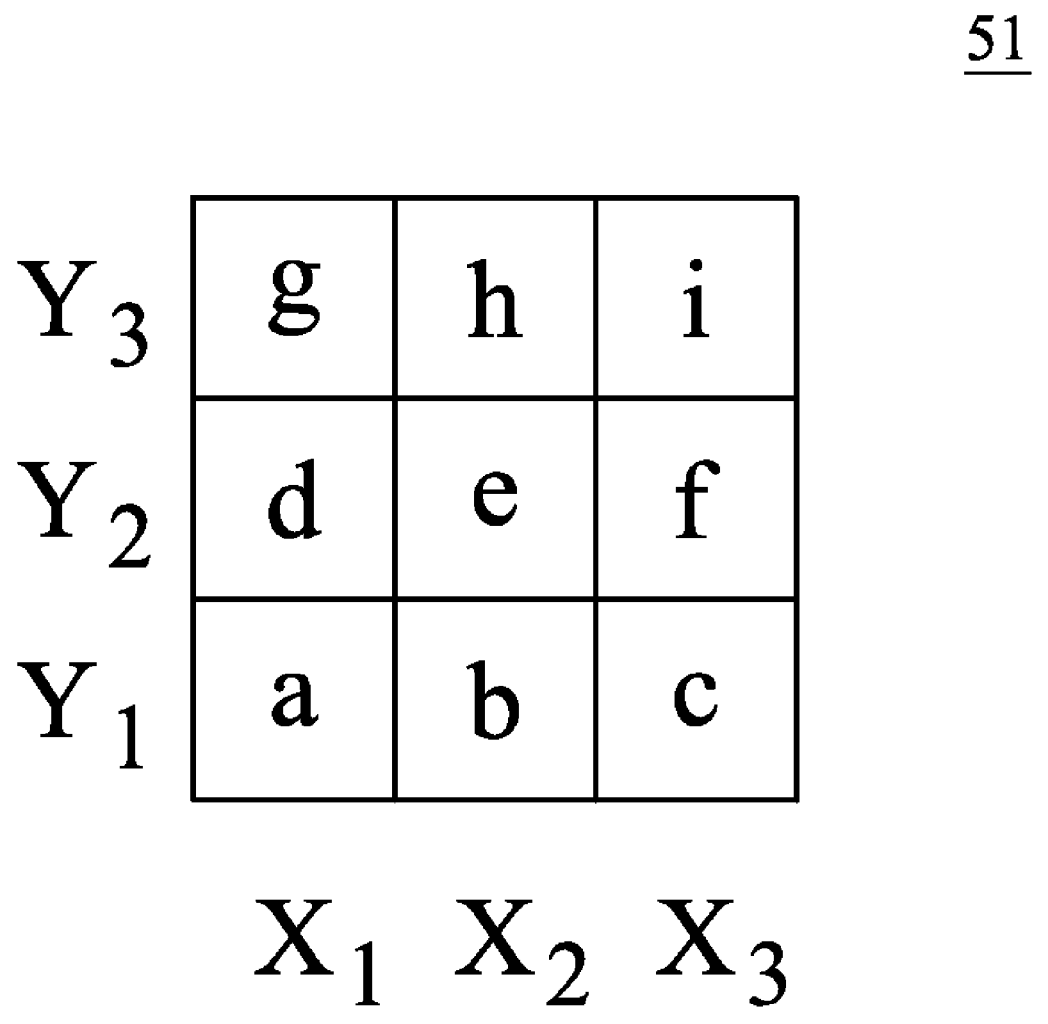

As shown in FIG. 5, for example, assume that the determinative area 51 is comprised of a 3×3 array, the differences acquired by the individual sensors in the determinative area 51 are a to i, and the sensors in the 3×3 array have relative horizontal coordinates of $X_1$, $X_2$ and $X_3$ and relative longitudinal coordinates of $Y_1$, $Y_2$ and $Y_3$ respectively. Then, the barycenter position (X, Y) in the determinative area 51 is calculated as follows:

$$X = \frac{\begin{array}{l}a \cdot X_1 + b \cdot X_2 + c \cdot X_3 + d \cdot X_1 + \\ e \cdot X_2 + f \cdot X_3 + g \cdot X_1 + h \cdot X_2 + i \cdot X_3\end{array}}{a+b+c+d+e+f+g+h+i}$$

$$Y = \frac{\begin{array}{l}a \cdot Y_1 + b \cdot Y_2 + c \cdot Y_3 + d \cdot Y_1 + \\ e \cdot Y_2 + f \cdot Y_3 + g \cdot Y_1 + h \cdot Y_2 + i \cdot Y_3\end{array}}{a+b+c+d+e+f+g+h+i}$$

The difference of each of the sensors in the determinative area 51 is calculated by the barycenter calculating module 60, and the obtained barycenter position (X,Y) is just the position of the touch point.

However, the embodiments described above are only provided to illustrate features of the present invention so that those skilled in the art can appreciate the disclosures of the present invention and practice the present invention accordingly, but not to limit the scope of the present invention. Accordingly, all equivalent modifications or alterations made without departing from spirits of the present invention shall still fall within the scope of the claims of the present invention.

What is claimed is:

1. A method for determining touch points on a touch panel, comprising:
   a sampling step for acquiring a first sensed value of each of sensors on the touch panel and storing the first sensed values;
   a difference calculating step for acquiring a second sensed value of each of the sensors and then acquiring a difference of each of the sensors, wherein the difference is obtained by subtracting the second sensed value sensed by each of the sensors from the first sensed value;
   a difference comparing step for comparing each of the differences with a preset threshold value and defining a touched sensor, wherein the difference of the touched sensor is greater than the preset threshold value and greater than the difference of each of the sensors adjacent to the touched sensor;
   a determinative area sampling step for acquiring each of the differences of the sensors in a determinative area, wherein the determinative area is centered around the touched sensor; and
   a barycenter calculating step for calculating a barycenter position according to each of the differences acquired in the determinative area sampling step, wherein the barycenter position comprises a longitudinal coordinate and a horizontal coordinate,
   wherein the barycenter position is a position of the touch point.

2. The method of claim 1, wherein the determinative area is formed by the sensors surrounding the touched sensor.

3. The method of claim 2, wherein the longitudinal coordinate is equal to a divisional result obtained by dividing a sum of each of the differences in the determinative area multiplied by a relative position longitudinal coordinate thereof with a sum of the differences, and the horizontal coordinate is equal to a divisional result obtained by dividing the sum of each of the differences in the determinative area multiplied by a relative position horizontal coordinate thereof with the sum of the differences.

4. The method of claim 3, wherein the preset threshold value is obtained by calculating an average value and a standard deviation according to each of the differences of the sensors in an area and adding up the average value and the standard deviation according to a ratio.

5. The method of claim 4, wherein the area comprises all of the sensors on the touch panel.

6. The method of claim 1, wherein the longitudinal coordinate is equal to a divisional result obtained by dividing a sum of each of the differences in the determinative area multiplied by a relative position longitudinal coordinate thereof with a sum of the differences, and the horizontal coordinate is equal to a divisional result obtained by dividing the sum of each of the differences in the determinative area multiplied by a relative position horizontal coordinate thereof with the sum of the differences.

7. The method of claim 6, wherein the preset threshold value is obtained by calculating an average value and a standard deviation according to each of the differences of the sensors in an area and adding up the average value and the standard deviation according to a ratio.

8. The method of claim 7, wherein the area comprises all of the sensors on the touch panel.

9. A system for determining touch points on a touch panel by using sensors on the touch panel, the system comprising:
- a sampling module electrically connected to the touch panel, being configured to acquire a first sensed value of each of the sensors on the touch panel and store the first sensed values;
- a difference calculating module electrically connected to the sampling module, being configured to acquire a second sensed value of each of the sensors and then acquire a difference of each of the sensors, wherein the difference is obtained by subtracting the second sensed value sensed by each of the sensors from the first sensed value;
- a difference comparing module electrically connected to the difference calculating module, being configured to compare each of the differences with a preset threshold value and define a touched sensor, wherein the difference of the touched sensor is greater than the preset threshold value and greater than the difference of each of the sensors adjacent to the touched sensor;
- a determinative area sampling module electrically connected to the difference comparing module, being configured to acquire each of the differences of the sensors in a determinative area, wherein the determinative area is centered around the touched sensor; and
- a barycenter calculating module, being configured to calculate a barycenter position according to each of the differences acquired by the determinative area sampling module, wherein the barycenter position comprises a longitudinal coordinate and a horizontal coordinate, wherein the barycenter position is a position of the touch point.

10. The system of claim 9, wherein the determinative area is formed by the sensors surrounding the touched sensor.

11. The system of claim 10, wherein the longitudinal coordinate is equal to a divisional result obtained by dividing a sum of each of the differences in the determinative area multiplied by a relative position longitudinal coordinate thereof with a sum of the differences, and the horizontal coordinate is equal to a divisional result obtained by dividing the sum of each of the differences in the determinative area multiplied by a relative position horizontal coordinate thereof with the sum of the differences.

12. The system of claim 11, wherein the preset threshold value is obtained by calculating an average value and a standard deviation according to each of the differences of the sensors in an area and adding up the average value and the standard deviation according to a ratio.

13. The system of claim 12, wherein the area comprises all of the sensors on the touch panel.

14. The system of claim 9, wherein the longitudinal coordinate is equal to a divisional result obtained by dividing a sum of each of the differences in the determinative area multiplied by a relative position longitudinal coordinate thereof with a sum of the differences, and the horizontal coordinate is equal to a divisional result obtained by dividing the sum of each of the differences in the determinative area multiplied by a relative position horizontal coordinate thereof with the sum of the differences.

15. The system of claim 14, wherein the preset threshold value is obtained by calculating an average value and a standard deviation according to each of the differences of the sensors in an area and adding up the average value and the standard deviation according to a ratio.

16. The system of claim 15, wherein the area comprises all of the sensors on the touch panel.

* * * * *